E. M. STAPLETON.
LAWN MOWER.
APPLICATION FILED APR. 1, 1908.
930,428.
Patented Aug. 10, 1909.
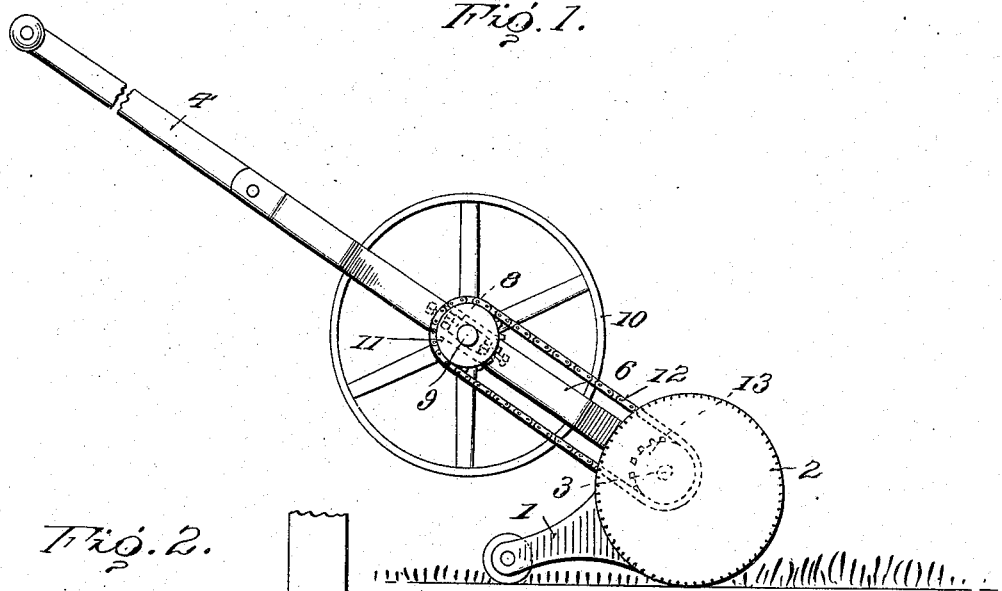
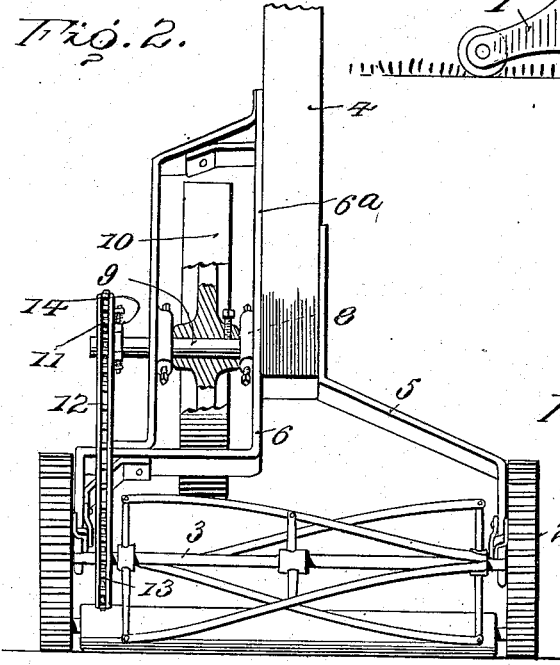
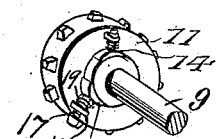
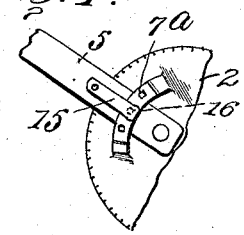
Inventor
E. M. Stapleton

UNITED STATES PATENT OFFICE.

EARL M. STAPLETON, OF CEDARVALE, KANSAS.

LAWN-MOWER.

No. 930,428.

Specification of Letters Patent.

Patented Aug. 10, 1909.

Application filed April 1, 1908. Serial No. 424,555.

*To all whom it may concern:*

Be it known that I, EARL M. STAPLETON, a citizen of the United States, residing at Cedarvale, in the county of Chautauqua and State of Kansas, have invented certain new and useful Improvements in Lawn-Mowers, of which the following is a specification.

The present invention relates to improvements in lawn mowers of that type which are provided with a fly wheel by means of which energy is stored in such a manner as to be subsequently utilized in driving the cutter, should the latter meet with more than the usual resistance.

The object of the invention is to provide a novel means for mounting the fly wheel which admits of the lawn mower being utilized in the customary manner, and which enables the fly wheel to rotate independently of the cutter should the latter meet with an unusual obstruction.

For a full understanding of the invention and the merits thereof and also to acquire a knowledge of the details of construction and the means for effecting the result, reference is to be had to the following description and accompanying drawings, in which:

Figure 1 is a side elevation of a lawn mower constructed in accordance with the invention. Fig. 2 is a top plan view of the same, portions being removed and shown in section. Fig. 3 is a detail view of the gear wheel upon the shaft of the fly wheel. Fig. 4 is a detail view of the connection between the brackets for the handle and the mower frame.

Corresponding and like parts are referred to in the following description and indicated in all the views of the drawings by the same reference characters.

The invention is shown for the purpose of illustration as applied to a lawn mower of the conventional construction, said lawn mower comprising a frame 1 supported by the drive wheels 2 from which motion is transmitted by the usual gearing to the rotary cutter shaft 3. The handle 4 is carried by the brackets 5 and 6 which are adjustably connected to opposite sides of the frame 1, as indicated in Fig. 4, to admit of the handle being raised or lowered to suit the requirements of different operators.

The bracket 6 comprises the spaced longitudinal side pieces 6ª having the bearing blocks 8 adjustably mounted thereon. Journaled within these bearing blocks is a shaft 9 having the fly wheel 10 rigid therewith, the said fly wheel being mounted to rotate between the side pieces 6ª. One end of the shaft 9 projects outwardly beyond the bracket 6 and carries a gear wheel 11 which is connected by a belt or chain 12 to a second gear wheel 13 rigid with the cutter shaft 3. The gear wheel 11 normally rotates with the fly wheel 10 and is provided with friction shoes 14 by means of which it is locked upon the shaft 9 under ordinary conditions. These friction shoes are each provided with a stem 17 which passes loosely through an eye 18 upon the gear wheel, springs 19 which surround the stems being interposed between the eyes and the shoes to hold the latter normally in operative position. With this construction it will be obvious that should the cutter of the lawn mower meet with an unusual obstruction, the fly wheel 10 can rotate independently of the gear wheel 11, thereby preventing the excess of strain which would otherwise be brought upon the members and which would probably result in injury to some of the parts of the mechanism. Under ordinary conditions, however, motion is transmitted from the cutter shaft 3 to the fly wheel 10 and the latter serves to store the energy in such a manner that it can be subsequently utilized for driving the cutter when the latter meets with slightly more than the usual resistance. This attachment also causes the cutter to have a uniform motion and relieves the operator of the usual shocks and jars due to the stopping and starting of the cutter. It is also desired to call attention to the fact that by adjusting the bearing blocks 8 upon the side pieces 6ª of the bracket 6, the fly wheel can be moved and the belt or chain 12 taken in or let out as required.

Referring more specifically to Fig. 4 it will be observed that the end plates of the frame 1 are provided with the keepers 7 through which the brackets 5 and 6 extend. Each of these keepers 7 has a plurality of angular openings 7ª formed therein and the corresponding bracket 5 or 6 is formed with a similar depression adapted to register with any selected one of the openings 7ª. A spring 15 is secured to each of the brackets 5 and 6 and carries a pin 16 designed to pass through one of the angular openings 7ª and engage the depression in the bracket to lock the handle 4 in an adjusted position. This manner of construction has the advantage of enabling the handle to be held in that position which is most advantageous to the operator and locks the same against the swinging movement which would be objectionable with the fly wheel.

Having thus described the invention, what is claimed as new is:

In a lawn mower, the combination of a frame, a rotary cutter mounted upon the frame, a handle bracket applied to the frame and formed with two spaced side pieces, a handle secured to the handle bracket, bearings adjustably mounted upon the spaced side pieces of the handle bracket, a shaft journaled within the bearings, and projecting upon one side of the handle bracket, a fly wheel rigid with the shaft and operating between the spaced side pieces of the handle bracket, a gear wheel loose upon the projecting end of the shaft, shoes carried by the gear wheel and frictionally engaging the shaft whereby the gear wheel and shaft are normally caused to rotate in unison, and a belt receiving motion from the cutter and transmitting it to the gear wheel, the said belt being adapted to be tightened or loosened by moving the before mentioned bearings.

In testimony whereof I affix my signature in presence of two witnesses.

EARL M. STAPLETON. [L. S.]

Witnesses:
N. B. HENDRICKS,
NORA G. BROWN.